3,184,310
REPRODUCTION LAYERS FOR PRINTING PLATES
Gerhard Fritz, Wiesbaden, and Oskar Süs, Fritz Uhlig, and Wilhelm Neugebauer, Wiesbaden-Biebrich, Germany, assignors, by mesne assignments, to Azoplate Corporation, Murray Hill, N.J.
No Drawing. Filed Jan. 13, 1960, Ser. No. 2,110
Claims priority, application Germany, Jan. 21, 1959, K 36,769
6 Claims. (Cl. 96—49)

Printing plates provided with a reproduction layer have already been manufactured which, in the reproduction layer, contain naphthoquinone-(1,2)-diazide-sulfoesters as light sensitive substances.

Now reproduction layers, especially for printing plates, have been found which comprise or consist of one or more light sensitive esters, having at least one free hydroxyl group, of naphthoquinone-(1,2)-diazide-sulfonic acids and such organic compounds, which have at least 2 hydroxyl groups, and contain two benzene or naphthalene nuclei linked to each other by a linking member X, the member X being sulfur or sulfur bonded to oxygen, and in which the benzene or naphthalene nuclei may contain, besides the hydroxyl groups, halides and/or alkyl and/or alkoxy and/or carbalkoxy radicals. If desired, the light sensitive esters can be applied in admixture with alkali soluble resins.

The light sensitive esters are prepared in known manner by reaction of the naphthoquinone-(1,2)-diazide-sulfonic acids, generally in the form of their sulfo-chlorides, with the organic compounds containing at least two hydroxyl groups. Those naphthoquinone-(1,2)-diazide-sulfoesters have proved especially suitable which are derived from naphthoquinone-(1,2)-diazide-(2) sulfonic acid-(5) or naphthoquinone - (1,2) - diazide-(2)-sulfonic acid-(4), but esters derived from other naphthoquinone-(1,2)-diazide sulfonic acids, such as naphthoquinone-(1,2)-diazide-(1)-sulfonic acid-(4), naphthoquinone-(1,2)-diazide-(1)-sulfonic acid-(5), naphthoquinone-(1,2)-diazide-(1)-sulfonic acid - (6), naphthoquinone-(1,2)-diazide-(1)-sulfonic acid-(7) and naphthoquinone-(1,2)-diazide-(1)-sulfonic acid-(8) may also be used.

Among the organic compounds containing at least two hydroxyl groups the following have been found to be especially suitable:

2,4,2′,4′-tetrahydroxy-diphenyl-sulfide
2,4,2′,4′-tetrahydroxy-diphenyl-sulfoxide As can be seen from this list, the compounds contemplated are those in which two benzene or naphthalene nuclei are joined to each other by sulfur, or sulfur bonded to oxygen. The two benzene or naphthalene nuclei together contain at least two hydroxyl groups. Besides these hydroxyl groups, there may be present in the benzene and naphthalene nuclei other substituents, such as halogens, e.g. chlorine, bromine or fluorine, or the benzene and naphthalene nuclei may be substituted by lower alkyl radicals or lower alkoxy radicals or carbalkoxy radicals.

For the preparation of the esters, the two components, of which the sulfonic acids are generally used in the form of their sulfochlorides, are usually dissolved in a solvent, such as dioxane, tetrahydrofurane, dimethylformamide, or ethyleneglycol monomethylether, and then esterified by adding to the solution an acid-binding agent, such as alkali bicarbonates, alkali-carbonates or other weak alkalies or amines, preferably tertiary amines, such as pyridine or N-ethyl-piperidine. Only such quantities of the acid-binding agent are to be used as will render the reaction mixture neutral or weakly alkaline, thus avoiding formation of a dyestuff. For separation, the reaction product is precipitated by adding water or preferably a dilute acid, e.g. dilute hydrochloric acid to the reaction mixture, then filtered by suction and dried. In most cases, the sulfoesters thus obtained can be immediately used for the preparation of the light sensitive reproduction layers. They may also be further purified by solution in a suitable solvent, such as dioxane, and subsequent reprecipitation by the addition of water to the solution. By choosing suitable quantities of the naphthoquinone-(1,2-diazide-sulfochloride and of the acid-binding agent used in a reaction, one or more hydroxyl groups may be esterified as desired.

For the preparation of the reproduction layers the naphthoquinone-(1,2)-diazide-sulfoesters containing hydroxyl groups are in known manner dissolved in organic solvents, such as ethyleneglycol monomethylether, ethyleneglycol monoethylether, dioxane, dimethyl formamide or aliphatic ketones, and then coated onto suitable supports, e.g. metal foils or plates consisting of aluminum, zinc or copper or of layers of several metals or plastic films or paper or glass. On these reproduction layers, copies are produced in known manner which are then transformed into printing plates by development, using advantageously dilute alkalies, especially alkaline-reacting salts, such as trisodium phosphate or disodium phosphate. Alkali soluble resins may also be incorporated into the reproduction layers, and such addition usually leads to an improved homogeneity of the film-like coating and better adhesion to the support. Alkali-soluble resins to be used for this purpose are: natural resins, such as shellac or colophony, or synthetic resins, such as copolymers of styrene or maleic anhydride and especially low-molecular condensation products of phenols and formaldehyde, the so-called "novolaks."

The amount of the alkali soluble resin to be added to the light sensitive diazo esters described above may vary widely. For the production of planographic printing plates lower concentrations of resins are used, i.e. from about 0.1 to about 1.0 part, preferably 0.3 to 0.8 part by weight of resin to 1.0 part by weight of ester. If plates are equipped which can withstand the acid etching agents used in etching machines, for example for the preparation of half-tone blocks, higher resin concentrations are used, i.e. from about 1.0 to about 6.0 parts, preferably from about 2.0 to about 4.0 parts by weight of the resin to 1.0 part of the above diazo esters.

The above described esters may also be used in admixture with each other or with other light sensitive substances.

Printing plates prepared by means of the above described naphthoquinone-(1.2)-diazide-(2)-sulfoesters are superior to printing plates prepared by means of esters hitherto used in that they are more easily developed and have improved thermal stability, which leads to an improvement of the shelf-life of the unexposed printing plates, even under adverse conditions.

The formulae of the compounds specifically referred to in the following examples are as follows:

Formula 1

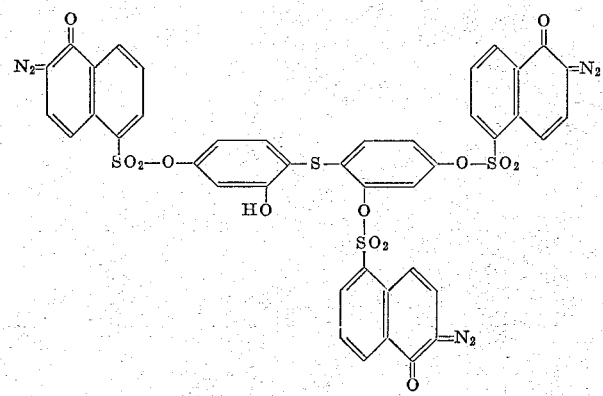

Formula 2

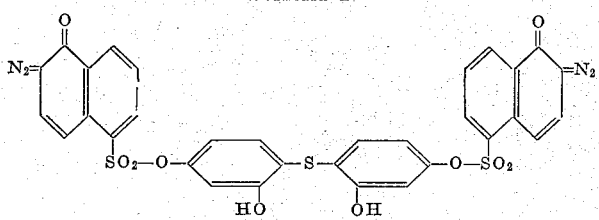

Formula 3

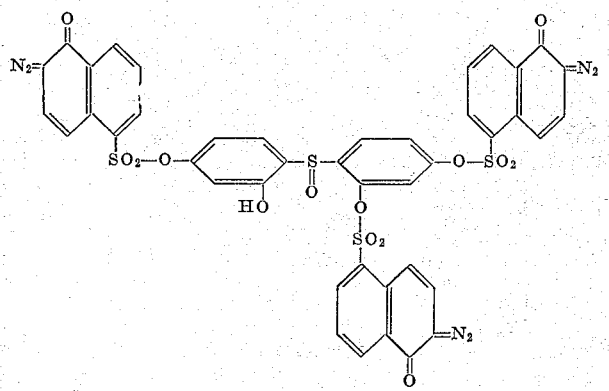

Formula 4

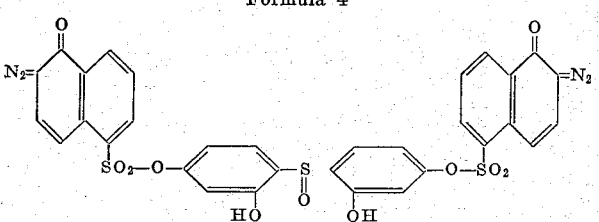

The invention will be further illustrated by reference to the following specific examples:

*Example 1*

1.5 parts by weight of the compound corresponding to Formula 1 and 1.5 parts by weight of colophony are dissolved in a mixture consisting of 8 parts by volume of isopropyl ketone and 2 parts by volume of ethyleneglycol monomethylether. This solution is coated onto a roughened aluminum foil, placed on a rotating disc and dried; the light sensitive layer thus formed is exposed under a master as is customary in the photomechanical production of printing plates, and then developed using a ten percent sodium carbonate solution as a developer. By this treatment, those parts of the coated layer are removed which were struck by light during exposure. The developed foil is briefly rinsed with water and treated with a 1 percent phosphoric acid solution to improve the hydrophilic properties of the base material now laid bare in those areas which were struck by light. The printing plate thus obtained can be inked with greasy ink and used for printing; it corresponds to the master used.

The diazo compound corresponding to formula 1 is prepared as follows:

75 parts by weight of 2,4,2',4'-tetrahydroxy-diphenyl-sulfide and 25.2 parts by weight of naphthoquinone-(1,2)-diazide-(2)-sulfochloride-(5) are dissolved in 200 parts by volume of dioxane. While agitating, a 10 percent sodium bicarbonate solution is slowly added until the reaction mixture has become neutral. Thereafter the reaction mixture is agitated for another hour. The crude product of the triester precipitates as an olive-brown oil which is decanted and digested with about 300 parts by volume of water. For purification of the tri-ester, which now has turned into a solid yellow product, it is dissolved in glacial acetic acid, reciprocated by adding water to the solution, and finally washed with 200 parts by volume of methanol. The thus purified substance begins to melt at 350° C. while slowly charring. The 2,4,2'-tri-(naphthoquinone-(1,2)-diazide-(2)-sulfonyloxy-(5)) - hydroxy - (4') - diphenyl-sulfide is easily soluble in ethyleneglycol monomethylether, but insoluble in alkalies, methanol and ethanol.

*Example 2*

Onto an anodically oxidized aluminum foil there is coated a solution of 1.5 parts by weight of the compound corresponding to Formula 2 in 100 parts by volume of a mixture consisting of equal parts of methyl isobutyl ketone and ethyleneglycol monomethylether, and the coating is then dried. The light sensitive layer thus formed is exposed under a transparent master, developed with a 1 percent trisodium phosphate solution using a cotton pad, then treated first with water and subsequently with a one percent phosphoric acid solution and finally inked with greasy ink. The printing plate thus obtained, which corresponds to the master used, may be used for making copies in a printing apparatus.

Equally good results are obtained when either of the compounds corresponding to Formula 3 or 4 is used instead of the compound corresponding to Formula 2.

The compound corresponding to Formula 2 is prepared as follows:

10.0 parts by weight of 2,2',4,4'-tetrahydroxydiphenyl-sulphide and 22.4 parts by weight of naphathoquinone-(1,2)-diazide-(2)-sulfochloride-(5) are dissolved together in 200 parts by volume of dioxane. While agitating and at room temperature, sufficient 10 percent sodium bicarbonate solution is slowly added as to render the reaction mixture neutral. For completion of the reaction, agitation is continued for one hour. After adding 200 parts by volume of water to the reaction mixture, the bis-ester precipitates as a yellow-brown solid substance. For purification, the 4,4'-bis-(napthoquinone-(1,2)-diazide-(2)-sulfonyloxy-(5)-dihydroxy-(2,2')-diphenyl-sulphide is dissolved in glacial acetic acid, reprecipitated by adding water to the solution and then digested with methanol. The bis-ester begins to melt at 350° C. while charring. It is readily soluble in ethyleneglycol monomethylether, difficultly soluble in methanol or ethanol, and insoluble in alkalies.

The compound corresponding to Formula 4 is prepared as follows:

10.8 parts by weight of 2,2'-4,4'-tetrahydroxydiphenyl-sulfoxide and 22.4 parts by weight of naphthoquinone-(1,2)-diazide-(2)-sulfochloride-(5) are dissolved together in a mixture of 150 parts by volume of dioxane and 50 parts by volume of water. While agitating and at room temperature, sufficient 10 per cent sodium bicarbonate solution is added to render the reaction mixture neutral. For complete reaction, the mixture is agitated for another hour. After adding 200 parts by volume of water, the bis-ester precipitates as a yellow-brown solid compound. For purification, the 4,4'-bis-(naphthoquinone-(1,2) - diazide - (2) - sulfonyloxy - (5)) - dihydroxy-(2,2')-diphenyl-sulfoxide is dissolved in glacial acetic acid, reprecipitated by adding water to the solution, and finally digested with methanol. The bis-ester begins to melt at about 350° C. with charring. It is readily soluble in ethyleneglycol monomethylether, difficultly soluble in methanol or ethanol, and insoluble in alkalies.

The compound corresponding to Formula 3 is prepared as follows:

10.6 parts by weight of 2,4,2',4'-tetrahydroxydiphenyl-sulfoxide and 33.6 parts by weight of naphthoquinone-(1,2)-diazide-(2)-sulfochloride-(5) are dissolved in 200 parts by volume of dioxane. While agitating and at room temperature, sufficient ten percent sodium bicarbonate solution is slowly added to render the reaction mixture neutral. The crude tri-ester precipitates as a yellow-brown semi-solid compound. 200 parts by volume of water are added to the reaction mixture and agitation is continued for one hour. The tri-ester, which now has solidified to form a yellow solid compound, is recrystallized from a dioxane-methanol mixture. It begins to melt at about 350° C. while slowly charring. The 2,4,4'-tri - (naphthoquinone - (1,2) - diazide - (2) - sulfonyl-oxy-(5))-hydroxy(2')-diphenyl-sulphoxide is readily soluble in ethyleneglycol monomethylether, difficultly soluble in methanol or ethanol, and insoluble in alkalies.

It will be obvious to those skilled in the art that many modifications may be made within the scope of the present invention without departing from the spirit thereof, and the invention includes all such modifications.

What is claimed is:

1. A compound having the formula

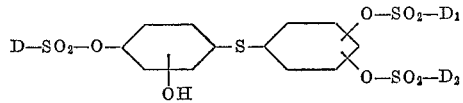

in which D, $D_1$ and $D_2$ are naphthoquinone-(1,2)-diazide groups.

2. A compound having the formula

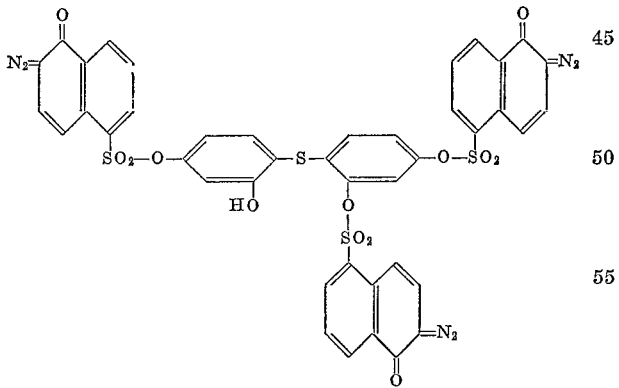

3. A presensitized printing plate comprising a base material coated with a layer comprising a compound having the formula

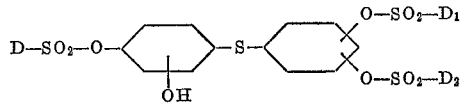

in which D, $D_1$ and $D_2$ are naphthoquinone-(1,2)-diazide groups.

4. A presensitized printing plate comprising a base material coated with a layer comprising a compound having the formula

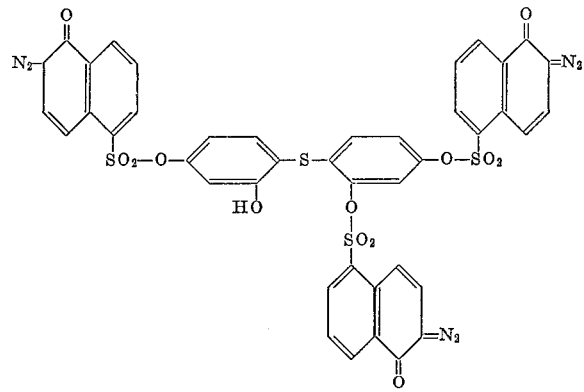

5. A process for making a printing plate which comprises exposing a coated base material to light under a master, the coating comprising a compound having the formula

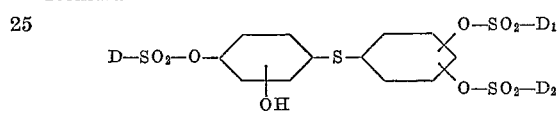

in which D, $D_1$ and $D_2$ are naphthoquinone-(1,2)-diazide groups, and treating the exposed coating with a developing solution.

6. A process for making a printing plate which comprises exposing a coated base material to light under a master, the coating comprising a compound having the formula

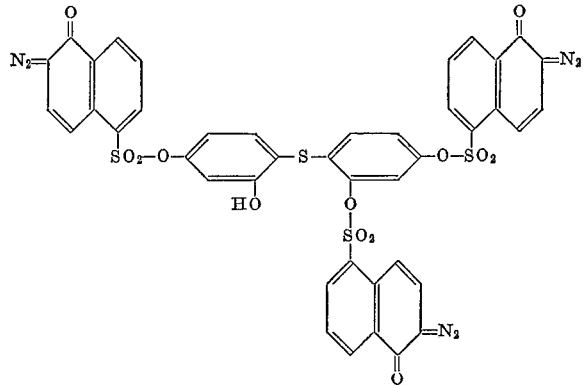

and treating the exposed coating with a developing solution.

References Cited by the Examiner

UNITED STATES PATENTS 2,717,832   9/55   Sulich _____ 96—91

FOREIGN PATENTS 706,028   3/54   Great Britain.
739,654   11/55  Great Britain.
737,379   9/55   Great Britain.
182,606   7/55   Austria.

NORMAN G. TORCHIN, *Primary Examiner.*

MILTON STERMAN, PHILIP E. MANGAN, ABRAHAM H. WINKELSTEIN, WILLIAM B. KNIGHT, *Examiners.*